(12) United States Patent
Delfini et al.

(10) Patent No.: US 7,441,338 B2
(45) Date of Patent: Oct. 28, 2008

(54) CLAMPING DEVICE FOR TOOLLESS CLAMPING OF A SAW BLADE

(75) Inventors: Stefano Delfini, Bettlach (CH); Daniel Saegesser, Langenthal (CH); Tobias Wunderli, Niedeschipp (CH)

(73) Assignee: Robert Bosch GmbH, Stuttgart (DE)

( * ) Notice: Subject to any disclaimer, the term of this patent is extended or adjusted under 35 U.S.C. 154(b) by 323 days.

(21) Appl. No.: 11/214,966

(22) Filed: Aug. 30, 2005

(65) Prior Publication Data

US 2006/0042445 A1   Mar. 2, 2006

(30) Foreign Application Priority Data

Aug. 31, 2004   (DE) .................. 10 2004 042 026

(51) Int. Cl.
B27B 19/09 (2006.01)

(52) U.S. Cl. .................. 30/392; 83/699.21; 279/81

(58) Field of Classification Search .............. 83/699.21, 83/699.31, 697; 30/392–394, 335, 337–339; 279/71, 87, 89, 76, 69, 81, 78, 79
See application file for complete search history.

(56) References Cited

U.S. PATENT DOCUMENTS

| | | | | |
|---|---|---|---|---|
| 3,542,097 A | * | 11/1970 | Dudek et al. .................. 30/392 |
| 3,927,893 A | | 12/1975 | Dillon et al. |
| 4,020,555 A | * | 5/1977 | Hedrick .................. 30/392 |
| 5,103,565 A | * | 4/1992 | Holzer, Jr. .................. 30/392 |
| 6,276,065 B1 | * | 8/2001 | Osada et al. .................. 30/392 |
| 6,638,290 B2 | * | 10/2003 | Pascaloff et al. .................. 606/177 |
| 6,851,194 B1 | * | 2/2005 | Chen et al. .................. 30/392 |
| 7,251,897 B2 | * | 8/2007 | Shuhua .................. 30/392 |
| 2002/0017026 A1 | * | 2/2002 | Kakiuchi et al. .................. 30/392 |
| 2003/0079353 A1 | * | 5/2003 | Lovell et al. .................. 30/392 |
| 2003/0150120 A1 | | 8/2003 | Hartmann et al. |
| 2004/0045425 A1 | * | 3/2004 | Houben et al. .................. 83/698.71 |
| 2004/0163264 A1 | * | 8/2004 | Simonz .................. 30/517 |
| 2005/0039340 A1 | | 2/2005 | Bigden et al. |

FOREIGN PATENT DOCUMENTS

| | | |
|---|---|---|
| GB | 2 328 643 | 3/1999 |
| GB | 2 338 205 | 12/1999 |
| WO | 02/22297 A1 | 3/2002 |

* cited by examiner

*Primary Examiner*—Boyer D. Ashley
*Assistant Examiner*—Laura M. Lee
(74) *Attorney, Agent, or Firm*—Michael J. Striker

(57) ABSTRACT

A clamping device for toolless clamping of saw blades equipped with the clamping shank for a hand machine tool has two clamping parts that are pressable against each other. Each of the clamping parts is provided with a support surface for the clamping shank of a saw blade insertable between the clamping parts. At least one of the clamping parts is movable in relation to the other of the clamping parts in order to clamp and release the clamping shank. An independent actuating element is movable by hand and provides a sliding movement or a rotating movement.

8 Claims, 8 Drawing Sheets

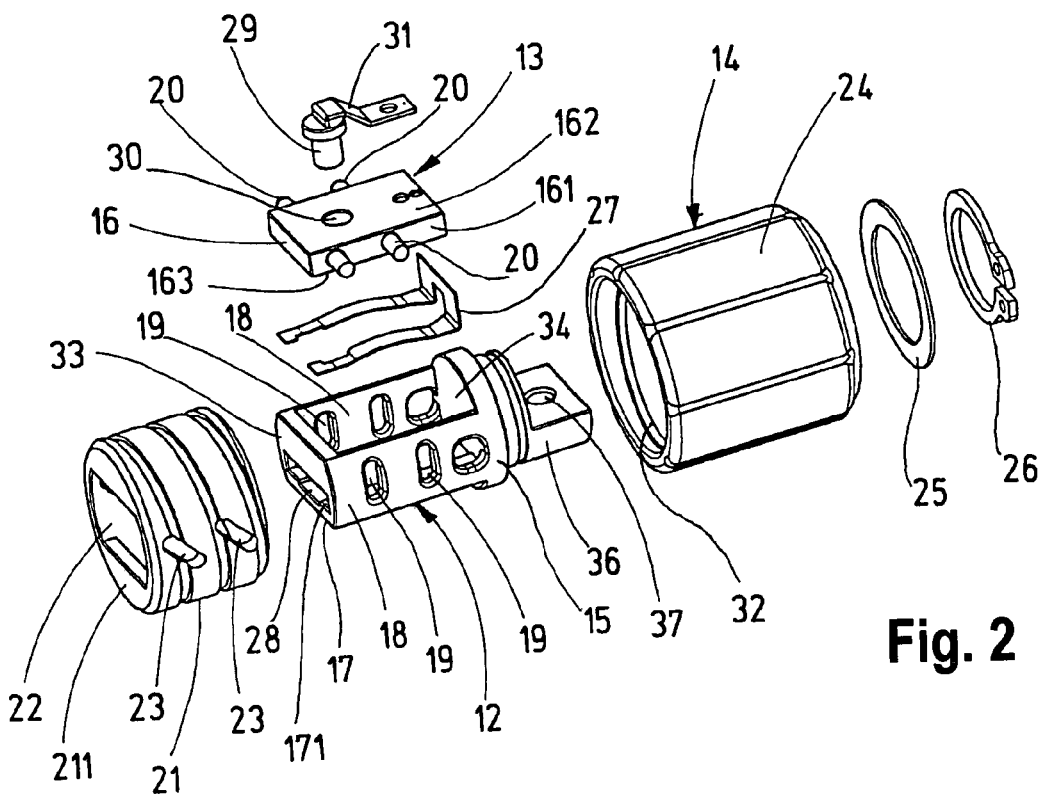
Fig. 2
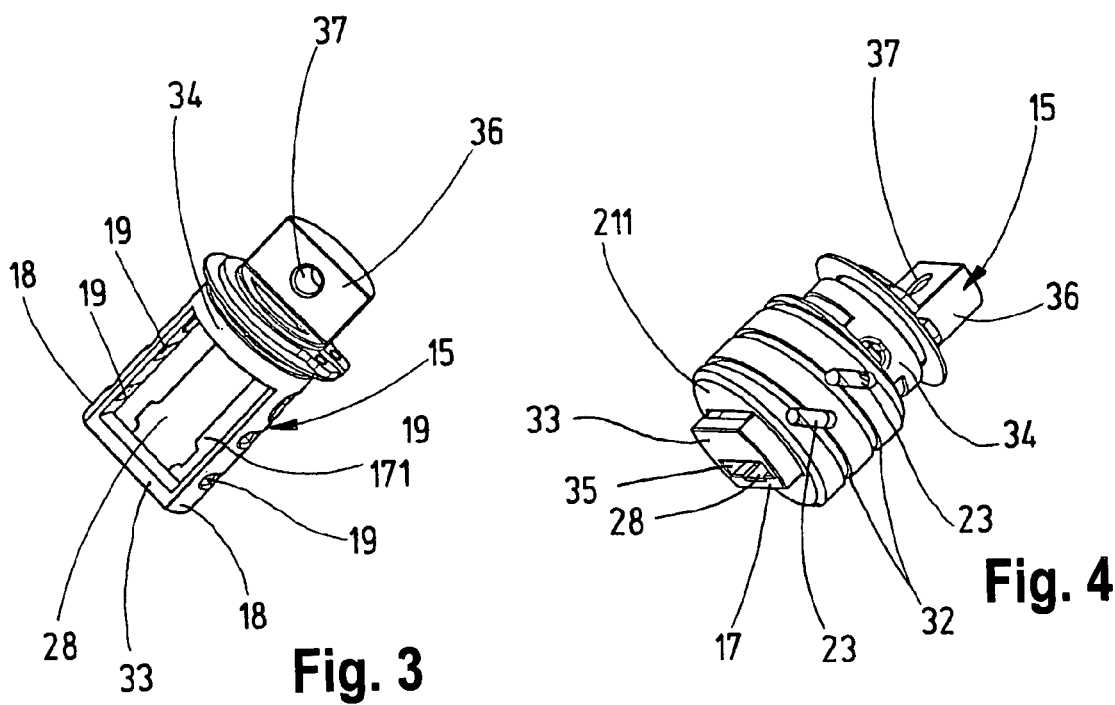
Fig. 3
Fig. 4

CLAMPING DEVICE FOR TOOLLESS CLAMPING OF A SAW BLADE

BACKGROUND OF THE INVENTION

The present invention is based on a clamping device for toolless clamping of a saw blade with a clamping shank for a hand machine tool, in particular a hand-guided power reciprocating saw.

A known clamping device of this kind has a support plate for supporting the clamping shank of a jigsaw blade embodied in the form of a single-cam shank, which support plate is snugly inserted into the electric motor-driven lifting rod of the hand-guided power reciprocating saw. The support plate is provided with a number of cams whose placement is adapted to the contour of the single-cam shank so that after the insertion of the single-cam shank, the cam device secures the saw blade against shifting axially on the support plate. Opposite from the support plate, there is a leaf spring whose free end is bent into a hook shape that engages the lower end of the support plate and a likewise bent grip part extending away from it for opening and closing the clamping device. A slot-shaped opening in the bent end permits the lower end of the support plate to pass through when the leaf spring with the bent catch is slid onto the back side of the support plate between the bent end and the grip part. In order to clamp a saw blade, after the grip is grasped, the leaf spring is lifted away from the support plate, the single-cam shank is inserted into the cam device between the leaf spring and the support plate and then the leaf spring is clamped against the back side of the support plate by means of its bent catch. This clamps the single-cam shank to the support plate and prevents a movement lateral to the stroke direction so that it cannot come out of the cam device.

SUMMARY OF THE INVENTION

Accordingly, it is an object of the present invention to provide a clamping device for tools clamping of a saw blade, which is a further improvement of the existing devices.

In keeping with these objects and with others which will become apparent hereinafter, one feature of the present invention resides, briefly stated, in a clamping device for toolless clamping of saw blades equipped with the clamping shank for a hand machine tool, said clamping device comprising two clamping parts that are pressable against each other, each of said clamping parts being provided with a support surface for the clamping shank of a saw blade insertable between said clamping parts, at least one of said clamping parts being movable in relation to the other of said clamping parts in order to clamp and release the clamping shank; and an independent actuating element that is movable by hand and providing a movement of said at least one clamping part selected from the group consisting of a sliding movement and rotating movement.

When the clamping device is designed in accordance with the present invention, it has the advantage that by coupling at least one clamping part to an actuating element that executes an axial sliding motion or a rotating motion, a significantly higher clamping force can be exerted on the clamping shank of the saw blade inserted between the clamping parts and can optionally be maintained by means of static friction so that it is possible to clamp different thicknesses of saw blade with different shank designs, e.g. the single-cam shank of universal saw blades or the ½" universal shank of sabre saw blades, with a sufficient degree of snugness and reliability.

According to one advantageous embodiment form of the present invention, at least one of the support surfaces of the clamping parts has a recess whose contour replicates the contour of a clamping shank of at least one of the saw blades to be clamped. This structural measure also allows particular jigsaw blades with a single-cam shank to be secured in the clamping device in a form-locked manner.

According to one advantageous embodiment form of the present invention, a positioning pin protrudes from one of the support surfaces of the clamping parts; this pin can be retracted behind the support surface counter to a spring force and is designed to be inserted in a form-locked manner into a positioning hole provided in a clamping shank of at least one of the saw blades to be clamped. This structural measure allows the clamping device to also hold universal saw blades with a ½" universal shank in a form-locked manner. The spring-elastic embodiment of the positioning pin means that this positioning pin does not interfere with the clamping of a jigsaw blade with a single-cam shank or the clamping of other saw blades.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is an exploded view of a clamping device for toolless clamping of the saw blades in FIG. 1 for a hand-guided power reciprocating saw according to a first exemplary embodiment, FIG. 3 is a top view of the tool clamp of the clamping device in FIG. 2, FIG. 4 is a perspective view of the tool clamp with a sliding sleeve of the clamping device in FIG. 1 slid onto it.

DESCRIPTION OF THE PREFERRED EMBODIMENTS

Figure 1:
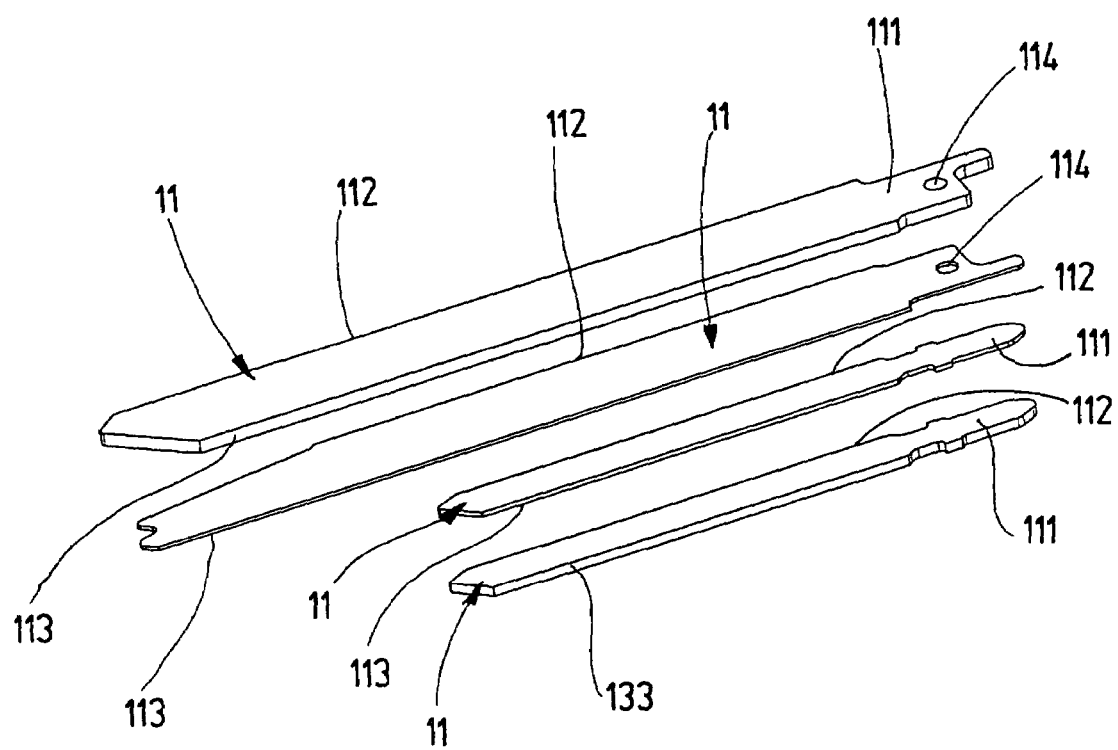
FIG. 1 is a perspective top view of various saw blades for a hand-guided power reciprocating saw.

The clamping devices described below for an electric motor-driven hand-guided power reciprocating saw are used to clamp saw blades 11 that not only have different thicknesses, but also have different designs of their clamping shank 111. Examples of such saw blades 11 are shown in a perspective top view in FIG. 1, with their respective rows 113 of saw teeth oriented away from the back 112 of the saw blade not shown in order to simplify the drawing. The two saw blades 11 at the top in FIG. 1 are so-called universal saw blades with a ½" universal shank that has a positioning hole 114, and the two lower saw blades 11 are so-called jigsaw blades with a single-cam shank. The clamping devices are attached to the lifting rod of the electric motor-driven hand-guided power reciprocating saw as described, for example, in WO 02/22297.

Basically, each clamping device has two clamping parts 12, 13 that can be pressed against each other in a nonpositive, frictional manner, each of which has a support surface for the clamping shank 111 of a saw blade 11 and at least one of the clamping parts can be slid in relation to the other in order to clamp and release the clamping shank 111 that is inserted between the clamping parts 12, 13 and rests against the support surfaces. The sliding movement of the at least one clamping part 12, 13 is derived from a sliding or rotating movement of an independent actuating element 14 that is moved by hand.

In the exemplary embodiment of the clamping device according to FIGS. 2 through 4, the one clamping part 12 is embodied in the form of a tool clamp 15 and the other clamping part 13 is embodied in the form of a slidable plate-shaped counterpart holder 16 that functions as a press part. The tool clamp 15 can be screwed to the lifter rod of the hand-guided power reciprocating saw and the counterpart holder 16 is guided in the tool clamp 15 so that it can move in relation to it. To this end, the tool clamp 15 has a base plate 17 with a flat support surface 171 for the clamping shank 111 of a saw blade 11 and two side walls 18 integral to the base plate 17 and protruding up from it, which are integrally connected at the two ends of the base plate 17 by means of cross pieces 33 and 34. The cross piece 33 is provided with a slot-like opening 35 to allow the clamping shank 111 of a saw blade 11 to pass through. The strut 34 is integrally connected to a fastening tang 36 with a fastening hole 37. The tool clamp 15 is screwed to the lifter rod of the hand-guided power reciprocating saw by means of the fastening hole 37.

The side walls 18 are the shape of a segment of the outer circumference of a hollow cylinder while the base plate 17 is flat. Each side wall 18 has two parallel guide slots 19 let into it, which are spaced apart from each other and extend at right angles to the base plate 17. The guide slots 19 in the side walls 18 are situated diametrically opposite from each other. On its side oriented toward the base plate 17, the counterpart holder 16 has a support surface 163 for the clamping shank 111 and on each of its narrow longitudinal sides 161 oriented away from each other, has two protruding guide pins 20 that pass through the guide slots 19 and can slide in them in the longitudinal direction of the guide slots 19. A hollow, cylindrical sliding sleeve 21 is slid onto the tool clamp 15. The ends of the sliding sleeve 21 are each closed by an end flange 211, which has a recess 22 that axially guides the sliding sleeve 21 against the side walls 18. The circumference or sleeve wall of the sliding sleeve 21 is provided with two diametrically opposed pairs of guide slots 23.

In each pair of guide slots 23, the guide slots 23 extend parallel to each other and at the same angle of inclination to the sleeve axis; the parallel spacing of the guide slots 23 corresponds to the spacing of the guide slots 19 in the side walls 18. The ends of the guide pins 20 passing through the guide slots 19 in the side walls 18 protrude into these guide slots 23. A rotating sleeve 24 that constitutes the actuating element 14 is placed onto the sliding sleeve 21; the sliding sleeve 21 and rotating sleeve 24 are coupled to each other by means of a trapezoidal thread 32. The above-described assembly of the clamping device shown in the exploded view in FIG. 1 is held together by a spring washer 25 and a retaining washer 26.

If the rotating sleeve 24 is turned, then the sliding sleeve 21 moves in the direction of the fastening tang 36, as a result of which the guide pins 20 on the counterpart holder 16 are lifted by means of the inclined guide slots 23 in the guide slots 19 of the side walls 18 so that a gap opens-up between the counterpart holder 16 and the base plate 17. The clamping shank 111 of a desired saw blade 11 is then inserted into the open clamping device; the insertion is facilitated by a guide plate 27 that is fastened to the tool clamp 15 between the counterpart holder 16 and the base plate 17. In order to lock the clamping device, the rotating sleeve 24 must be turned back again, which causes the sliding sleeve 21 to slide in the opposite direction and by means of the inclined guide slots 23, slides the guide pins 20 downward in the guide slots 19 of the side walls 18. The counterpart holder 16 is pressed with its support surface 163 against the saw blade shank 111 resting on the support surface 171 of the base plate 17. The pressing force is reliably maintained by the static friction in the trapezoidal thread 32.

As is particularly clear from FIG. 3, the base plate 17 is provided with a recess 28 that constitutes a cavity in the support surface 171, which is adapted to the contour of a clamping shank 111 embodied in the form of a single-cam shank. The single-cam shank is accommodated in a form-locked manner in this recess 28 and cannot be pulled out of the clamping device even when powerful axial forces are exerted on the saw blade 11.

In order to axially immobilize a saw blade 11 equipped with a ½" universal shank, a positioning pin 29 is provided, which can engage in a form-locked manner in the positioning hole 114 provided in the clamping shank 111. This positioning pin 29 passes through a guide hole 30 extending through the support surface 163 of the counterpart holder 16 and is subjected to a spring force acting in the direction of the base plate 17, which causes it to protrude beyond the support surface 163 of the counterpart holder 16. The spring force is generated by a leaf spring 31, which is fastened to the back side 162 of the counterpart holder 16 oriented away from the support surface 163 and presses against the end of the positioning pin 29 oriented away from the base plate 17. If a universal saw blade is accommodated in the clamping device, then the action of the leaf spring 31 causes the positioning pin 29 to travel through the positioning hole 114 in the ½" universal shank and presses it in a spring-elastic fashion against the base plate 17. If the single-cam shank of a saw blade 11 is in the clamping device, then the leaf spring 31 presses the positioning pin 29 against the single-cam shank.

In the clamping device shown in FIGS. 5 through 8 for the saw blades 11 shown in FIG. 1, the stationary clamping part 12 is once again embodied in the form of a tool clamp 40 and the clamping part 13 that can move in relation to it is once again embodied in the form of a counterpart holder 41 that is held in the tool clamp 40 so that it can move in relation to it, which functions as a press part. The tool clamp 40 is press-fitted and hard soldered or laser welded to the lifter rod of the hand-guided power reciprocating saw. The tool clamp 40 is comprised of a base body 42 and a cover 43, which covers the base body 42 and is connected to it in detent fashion by means of detent projections 44 and detent recesses 45.

At the bottom of the base body 42, a support surface 421 is provided for the clamping shank 111 of a saw blade 11. The rectangular counterpart holder 41 provided with the other support surface 411 for the clamping shank 111 is guided in a movable fashion on two locating pins 47, which are press-fitted into a matrix 49 and protrude into two through openings 48 spaced apart from each other in the counterpart holder 41. A compression spring is slid onto each locating pin 47. The two compression springs 50 are supported at one end against the counterpart holder 41 and at the other end against the matrix 49 and in the unstressed state, place the counterpart holder 41 at a definite distance from the matrix 49.

The matrix 49, which acts as a coupling element between the movable clamping part 13 and the actuating part 14, is guided in an axially movable fashion on four parallel guide pins 51 anchored in the base body 42, which are inserted into slide bores 491 in the matrix 49. A compression spring 52 is slid onto each guide pin 51. The four compression springs 52 rest against the base body 42 at one end and rest against the matrix 49 at the other end and place the matrix 49 against the underside of the cover 43.

The actuating element 14 for closing and opening the clamping device acts on the counterpart holder 41 by means of the matrix 49 and, by increasing the clamping force of the compression springs 52, presses it with its support surface 441 against the support surface 421 of the base body 42 or against a clamping shank 111 of a saw blade 11 lying between the support surfaces 411, 421. The actuating element 14 has a slider 54, which is attached to a grip part 53 and cooperates with a ramp 55 provided in the top side of the matrix 49 oriented toward the cover 43. The ramp 55 rises from one end of the matrix 49 to the other (from left to right in FIGS. 5 and 8) so that when the slider 54 is slid along the ramp 55 from left to right in FIGS. 5 and 8, the slider 54 supported on the underside of the cover 43 shifts the matrix 49 downward, placing stress on the compression springs 52 on the guide pins 51. The grip part 53 has a knob 531 and a shaft 532 integrally connected to it, which protrudes through a slot 56 in the cover 43 aligned with the ramp 55 and is anchored in the slider 54.

Figure 5:
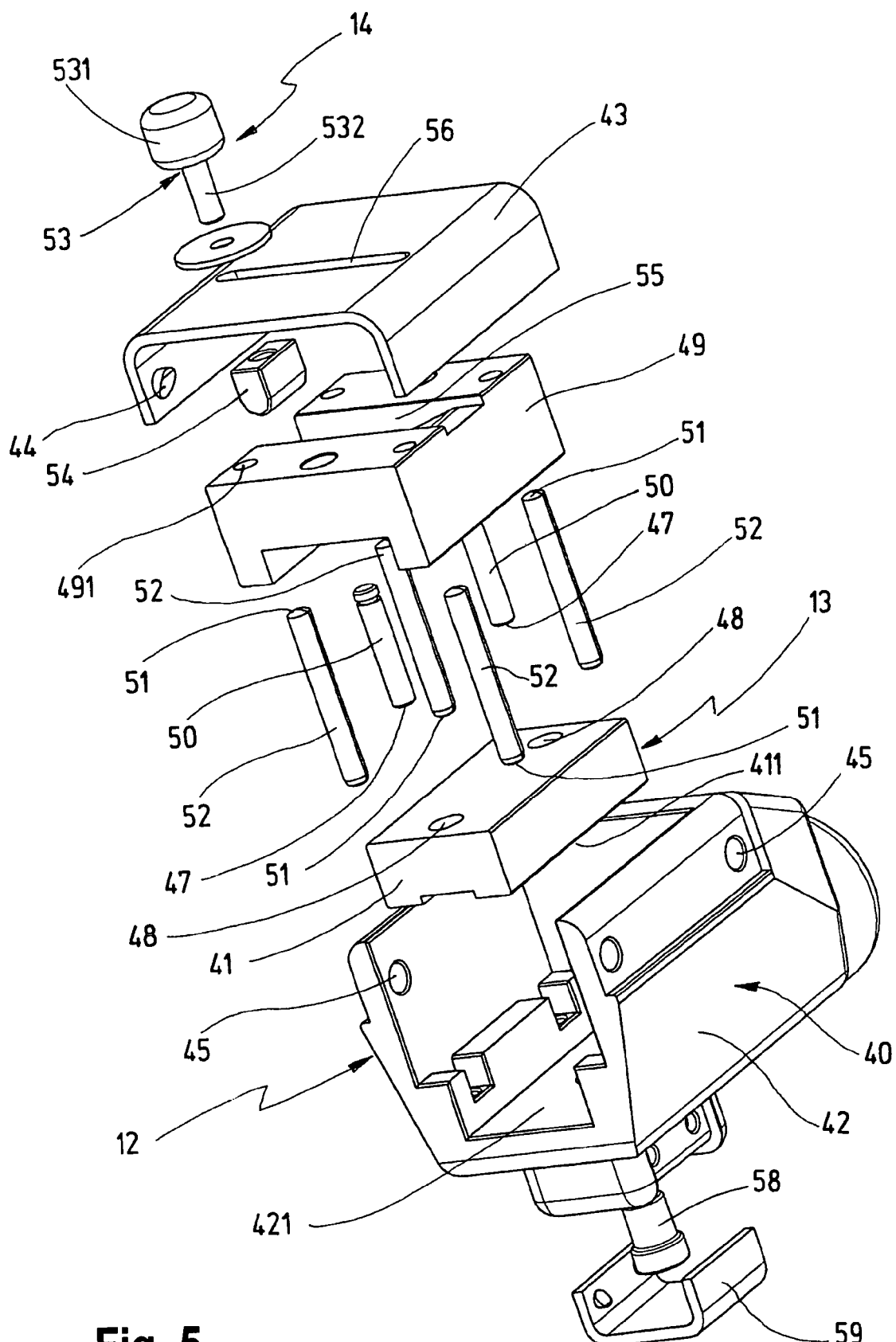
FIG. 5 is an exploded view of a clamping device according to a second exemplary embodiment, FIGS. 6 and 7 each show a perspective view of the clamping device in FIG. 5.
Figure 8:
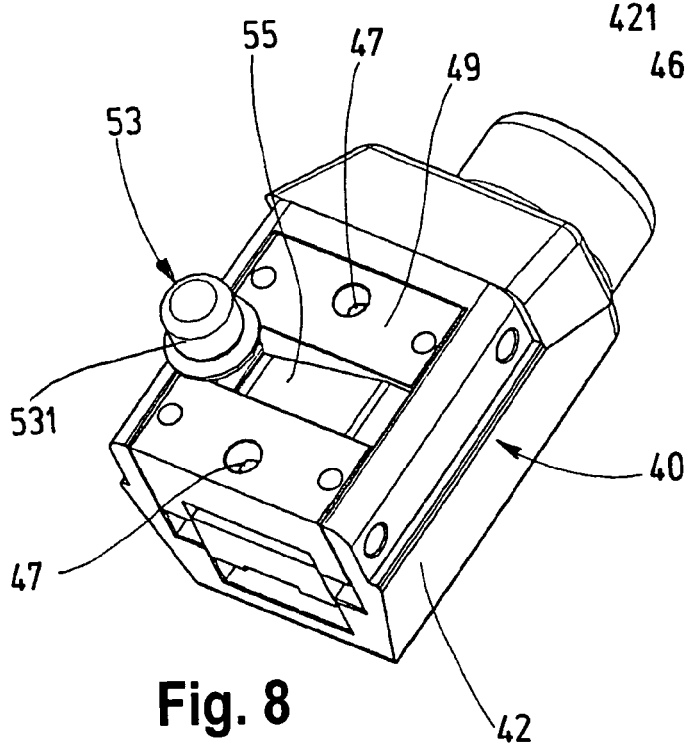
FIG. 8 is a perspective view of the clamping device in FIGS. 6 or 7 with the cover removed.

If the clamping shank 111 of a saw blade 11 is placed against the support surface 421 of the base body 42 and the knob 531 is moved manually in the slot 56 of the cover 43 from left to right in FIGS. 5 and 8, then the matrix 49 is slid toward the base body 42 on the guide pins 51, counter to the force of the compression springs 52 and, by means the compression springs 50 on the locating pins 47, presses the counterpart holder 41 with its support surface 411 against the clamping shank 111 so that the latter is clamped tight between the counterpart holder 41 and the base body 42 in a nonpositive, frictionally engaging way by the stressed compression springs 50. If the knob 531 is moved back again, then the stressed compression springs 52 push the matrix 49 back up again until it rests against the underside of the cover 43. The compression springs 50 lift the counterpart holder 41 away from the clamping shank 111.

Figure 6:
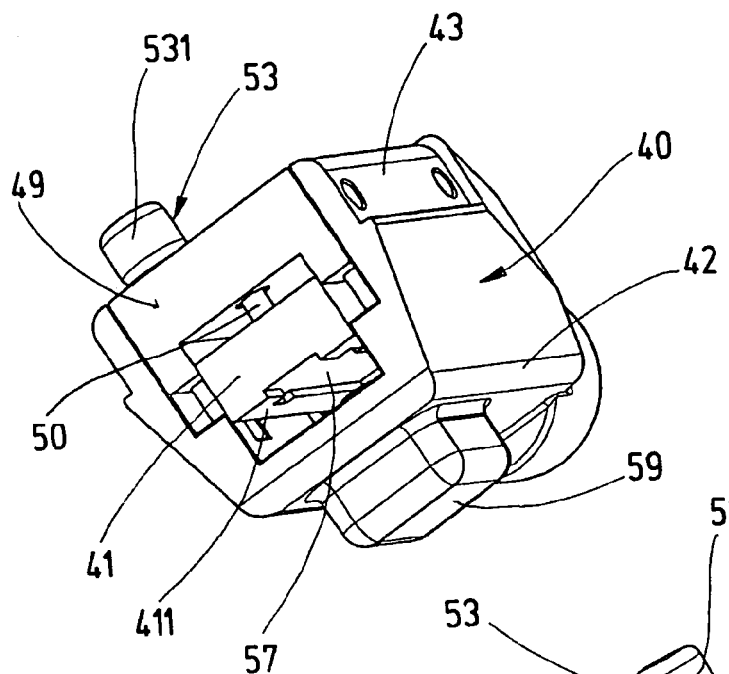
Figure 7:
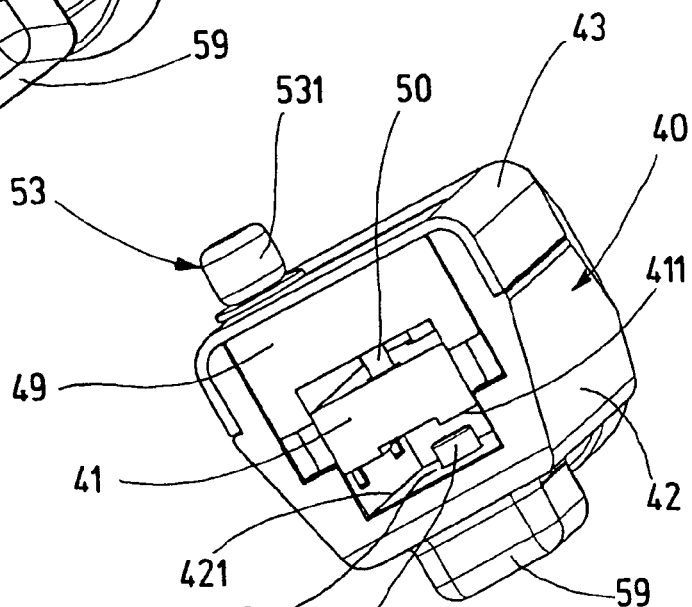

As is clear from FIG. 6, the support surface 411 of the counterpart holder 41 is provided with a recess 57 that constitutes a cavity that accommodates the single-cam shank of a jigsaw blade in a form-locked manner. In order to clamp a universal saw blade, a positioning pin 58 is once again provided, which can protrude through the positioning hole 114 in the ½" universal shank in a form-locked manner. The positioning pin 58 is supported on a holding piece 59 by means of a compression spring, not shown here, that is clipped to the base body 42. The positioning pin 58 is guided in a guide hole 46 extending through the support surface 421 in the base body 42 and protrudes slightly beyond the support surface 421 so that it can protrude into the positioning hole 114 of the ½" universal shank when a universal saw blade is being clamped. If a jigsaw blade with a single-cam shank is inserted into the clamping device, then the single-cam shank pushes the positioning pin 58 back behind the support surface 421.

Figure 9:
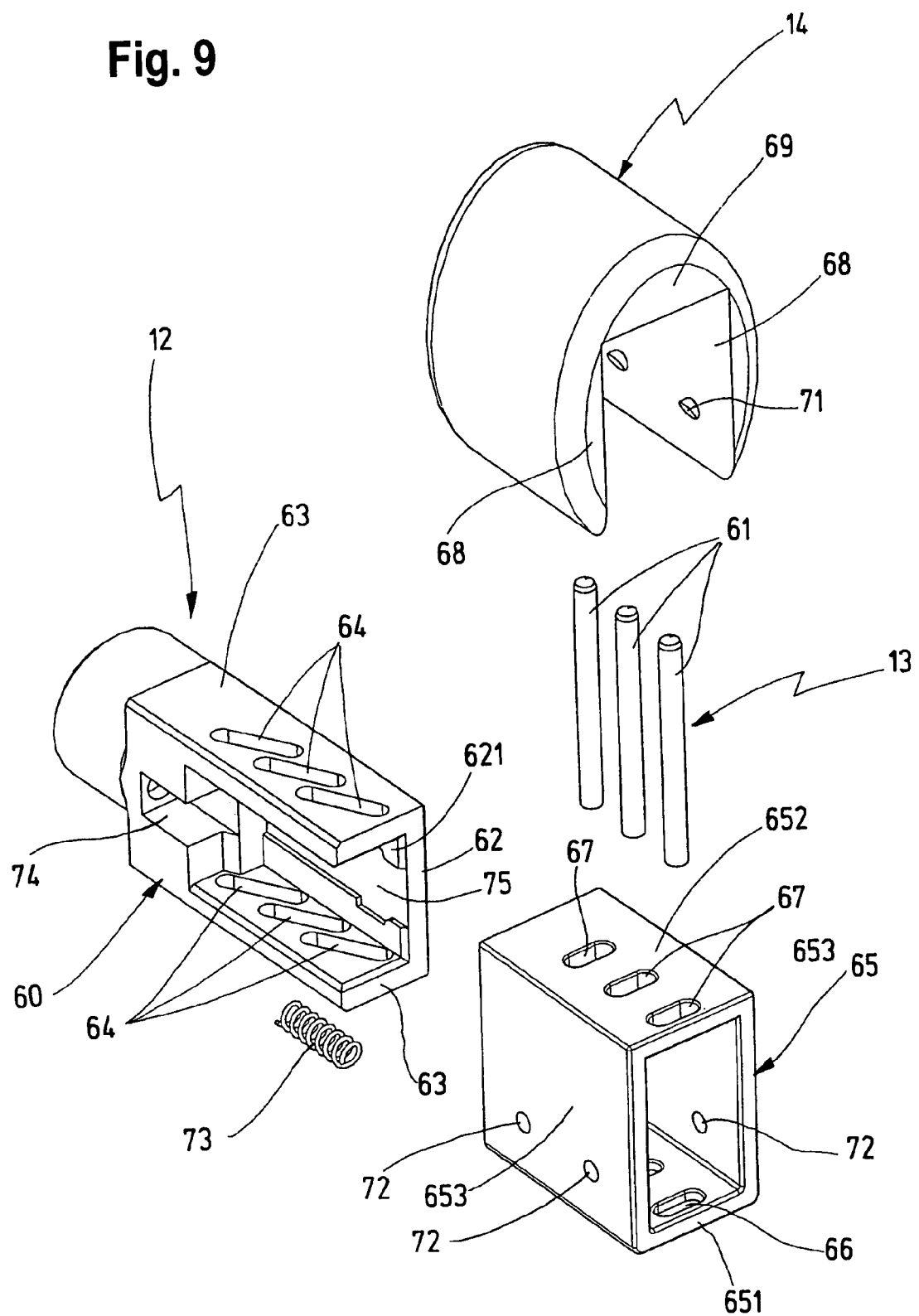
FIG. 9 is an exploded view of a clamping device according to a third exemplary embodiment.

In the clamping device shown in FIGS. 9 through 13, the one clamping part 12 is once again embodied in the form of a tool clamp 60, which is press-fitted and hard soldered or laser welded to the lifter rod of the hand-guided power reciprocating saw at its left end in FIG. 9 and the clamping part 13 that can move in relation to it is provided in the form of several clamping pins 61, three clamping pins 61 in the exemplary embodiment, that function as a press part. The tool clamp 60, which is approximately U-shaped in cross section, has a base plate 62 with a support surface 621 onto which the clamping shank 111 of a saw blade 11 is to be placed and two side walls 63 that are integral to the base plate 62 and protrude up from it at right angles spaced apart from each other. The support surface 621 of the base plate 62 is provided with a recess 75 for the form-locked accommodation of a single-cam shank of a jigsaw blade. Each side wall 63 has a number of guide slots 64 integrated into it that corresponds to the number of clamping pins 61, three in this case. The guide slots 64 extend parallel to one another and at the same angle of inclination to the longitudinal axis of the tool clamp 60. The guide slots 64 in the two side walls 63 are aligned with one another. The tool clamp 60 has a sliding sleeve 65 with a box-shaped profile slid onto it, which is guided so that it can move axially on the tool clamp 60 and represents a coupling element between the mobile clamping part 13 and the actuating element 14.

The sleeve wall 651 of the sliding sleeve 65 covering the lower side wall 63 in FIG. 9 has three parallel transverse grooves 66 that extend at right angles to the longitudinal axis of the sliding sleeve 65 and the parallel spacing of these grooves corresponds to the spacing between the guide slots 64 in the side walls 63 of the tool clamp 60. The sleeve wall 652 of the sliding sleeve 65 covering the upper side wall 63 in FIG. 9 has transverse slots 67 that are situated and embodied in the same way as the transverse grooves 66 in the lower sleeve wall 651. The transverse grooves 66 and the transverse slots 67 are flush with one another. The groove width of the transverse grooves 66, the slot width of the transverse slots 67, and the slot width of the guide slots 64 are selected to be slightly greater than the outer diameter of the clamping pins 61 so that the latter can slide in the guide slots 64, the transverse slots 67, and the transverse grooves 66.

Figure 10:
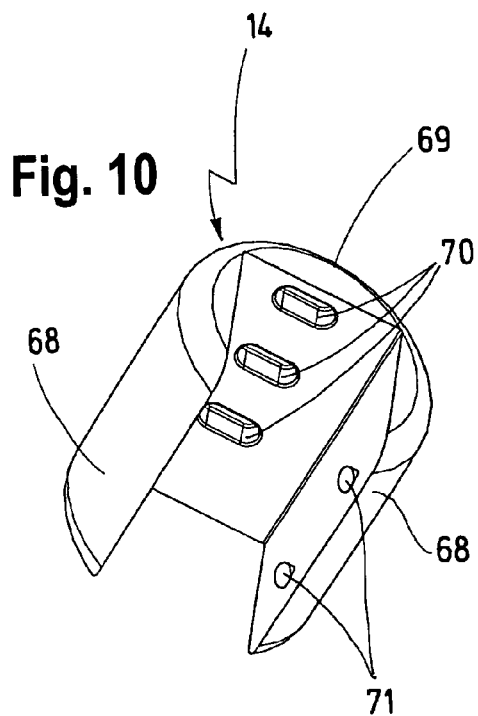
FIG. 10 is a perspective bottom view of the actuation element of the clamping device in FIG. 9.
Figure 12:
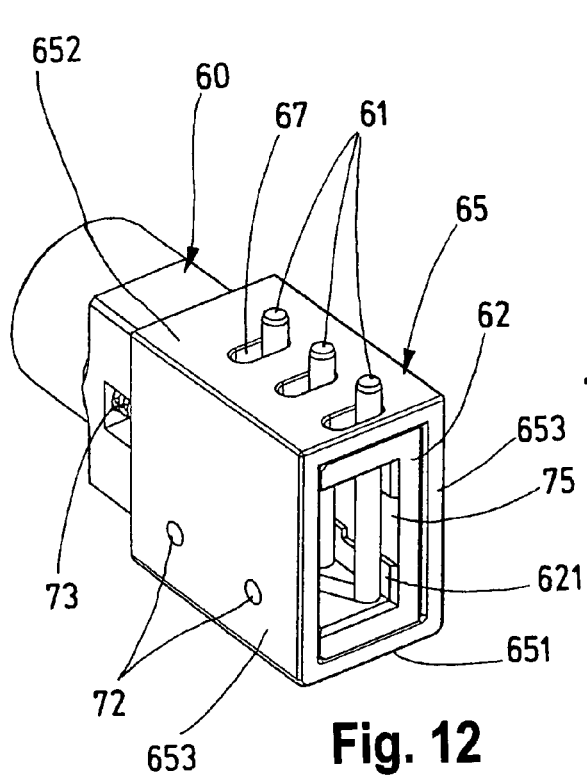
FIG. 12 is a perspective view of the clamping device in FIG. 11, with the actuating element removed.
Figure 13:
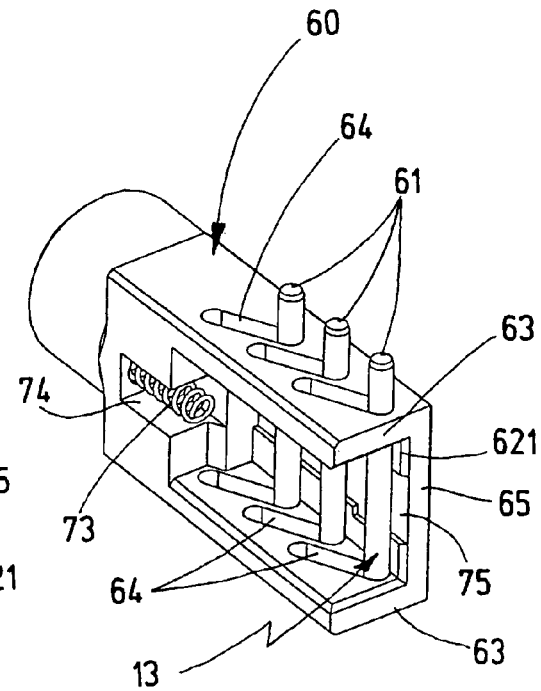
FIG. 13 is a perspective view of the clamping device in FIG. 12, with the sliding sleeve removed.
Figure 14:
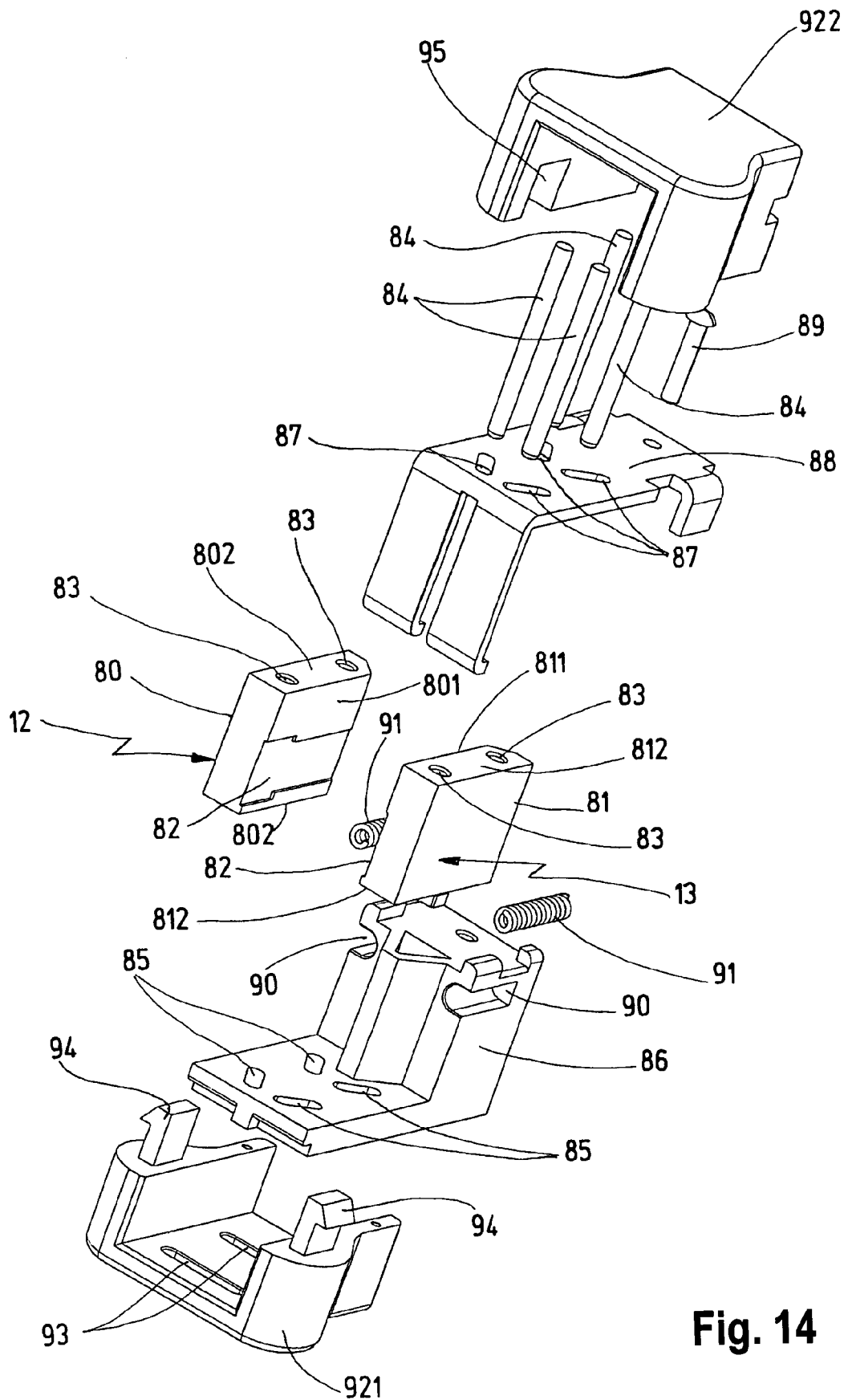
FIG. 14 is an exploded view of a clamping device according to a fourth exemplary embodiment.

After the sliding sleeve 65 is slid onto the tool clamp 60, the clamping pins 61 are guided through the transverse slots 67 in the upper sleeve wall 652 of the sliding sleeve 65 and through congruent underlying regions of the inclined guide slots 64 in the upper side wall 63 and in the lower side wall of the tool clamp 60 and are inserted into the transverse grooves 66 in the lower sleeve wall 651 of the sliding sleeve 65 (FIG. 12). The actuating element 14 is embodied with a U-shaped inner profile so that its legs 68 can embrace the sleeve walls 653 of the sliding sleeve 65 that extend at right angles to the sleeve walls 651 and 652 containing the transverse slots 67 and transverse grooves 66. The cross piece 69 that joins the legs 68 of the actuating member 14 has grooves 70 let into it that are the same as the ones in the lower sleeve wall 651 of the sliding sleeve 65 (FIG. 10).

When the actuating element 14 is placed onto the sliding sleeve 65, the ends of the clamping pins 61 protruding from the sliding sleeve 65 are accommodated in the transverse grooves 70 and detent projections 71 (FIG. 10) on the legs 68 engage in detent fashion with detent holes 72 (FIG. 12) provided in the sleeve walls 653. A compression spring 73 that maintains the clamping force of the clamping device is inserted into a groove 74 extending in the sliding direction of the sliding sleeve 65 in the tool clamp 60 and rests against the tool clamp 60 at one end and rests against the sliding sleeve 65 at the other. The above-described design of the clamping device is shown in FIG. 11.

Figure 11:
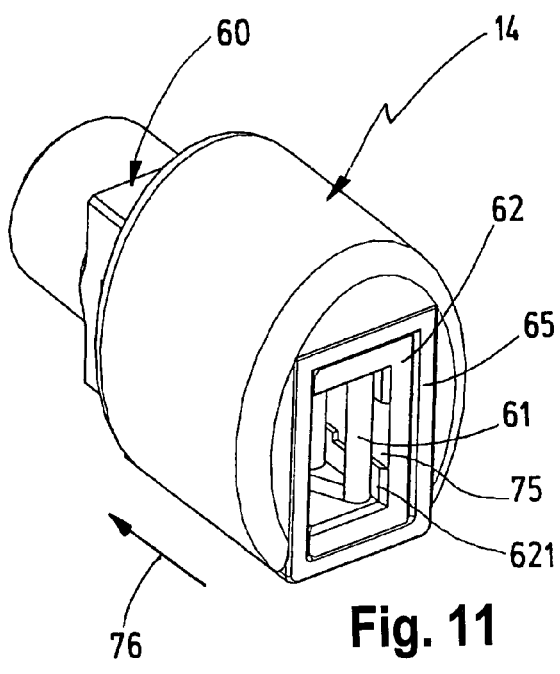
FIG. 11 is a perspective view of the clamping device in FIG. 9.

If the actuating element 14 is then slid in the direction of the arrow 76 in FIG. 11 on the tool clamp 60, then the clamping pins 61 are slid in the transverse grooves 66 and 70, in the transverse slots 67, and in the inclined guide slots 64. The inclination of the guide slots 64 in the tool clamp 60 causes their distance from the base plate 62 to increase. This produces an open space between the base plate 62 and the clamping pins 61 into which the clamping shank 111 of a saw blade 11 can be inserted. If the actuating element 14 is released after the insertion of the saw blade 11, then the compression spring 73 that has been stressed by the sliding of the actuating element 14 in the direction of the arrow 76 pushes the sliding sleeve 65 back again, as a result of which the clamping pins 61 at the other end of the guide slots 64 are slid back and thus press against the clamping shank 111 resting on the support surface 621 of the base plate 62.

In the clamping device for a saw blade 11 shown in FIGS. 14 through 17, the clamping parts 12, 13 are embodied in the form of two plate-shaped clamping jaws 80, 81 that can be moved toward and away from each other, whose large surfaces oriented toward each other constitute the support surfaces 801 and 811 for the clamping shank 111 of a saw blade 11 and each have a recess 82 that is adapted to the contour of a single-cam shank in order to permit them to accommodate a single-cam shank in a form-locked manner. The sum of the depths of the two recesses 82 is less than the narrowest saw blade thickness of the saw blades 11 they are intended to clamp. Each clamping jaw 80, 81 is provided with two bores 83 spaced apart from each other and parallel to the support surface 801 to 811 and a guide bolt 84 is guided through each of them.

The guide bolts 84 are long enough that their ends protrude beyond the narrow sides 802 and 812 extending at right angles to the support surfaces 801, 811 and constitute four guide pins 841 (FIGS. 16 and 17) there for the clamping jaws 80, 81. In order to produce a sliding motion of the clamping jaws 80, 81, these guide pins 841 protrude through guide slots 85 in a holder 86 at one end and protrude through guide slots 87 in a counterpart holder 88 at the other. Two pairs of respective guide slots 85 and 87 are spaced the same distance apart from each other as the bores 83 in the clamping jaws 80 and extend parallel at an angle of inclination to the longitudinal axis of the holder 86 and counterpart holder 88.

The guide slots 85 and 87 for the one clamping jaw 80 and the guide slots 85 and 87 for the other clamping jaw 81 in the holder 86 and counterpart holder 88 are oriented in relation to one another to produce a wedge-shaped or herringbone-like pattern of the guide slots 85 and 87 in the holder 86 and counterpart holder 88. The holder 86 is press-fitted and hard soldered or laser welded to the lifter rod of the hand-guided power reciprocating saw and the counterpart holder 88 is attached to the holder 86 by means of a rivet 89. Two grooves 90 extending in the axial direction of the holder 86 are provided on the opposite sides of the holder 86 and are each intended to accommodate a clamping spring 91 embodied in the form of a compression spring.

The actuating element 14 for moving the clamping jaws 80, 81 is embodied in the form of a two-part sliding grip 92 with two essentially U-shaped grip parts 921, 922 that can engage with each other in detent fashion. The bridge piece bottom of each grip part 921, 922 has two transverse grooves 93 spaced apart from each other incorporated into it, which extend at right angles to the movement direction of the actuating element 14 or to the longitudinal axis of the holder 86. The distance between the transverse grooves 93 corresponds to the distance between the guide slots 85 and 87 in the holder 86 and counterpart holder 88. The two grip parts 921, 922 are slid from below and above onto the preassembled unit comprised of the holder 86 and counterpart holder 88, with clamping jaws 80, 81 lying between them, supported on the guide bolts 84 (FIG. 16) so that the guide pins 841 at the upper and lower ends of the guide bolts 84 protrude into the transverse grooves 93 in the two grip parts 921, 922. The two grip parts 921, 922 engage each other in detent fashion by means of detent projections 94 protruding from the lower grip part 921 and detent recesses 95 incorporated into the upper grip part 922.

Figure 15:
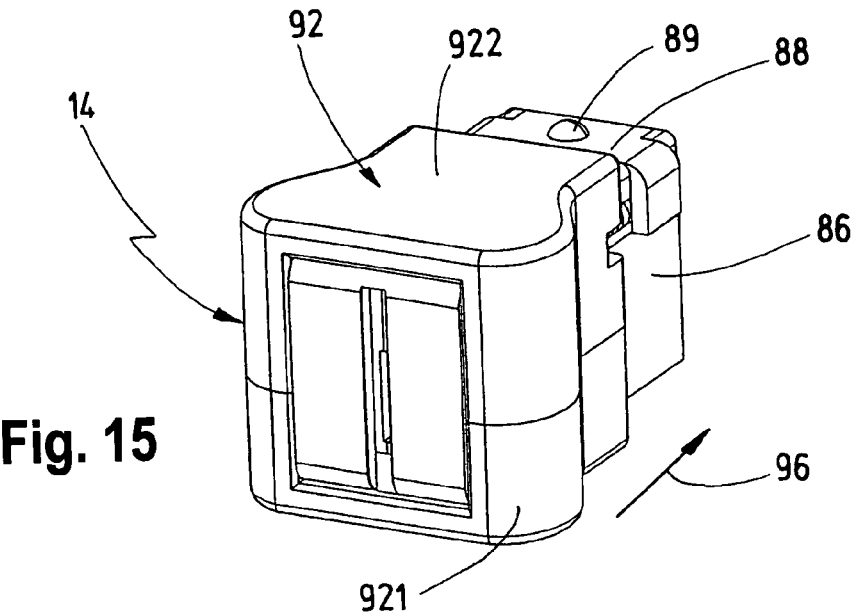
FIG. 15 is a perspective view of the clamping device in FIG. 14.
Figure 16:
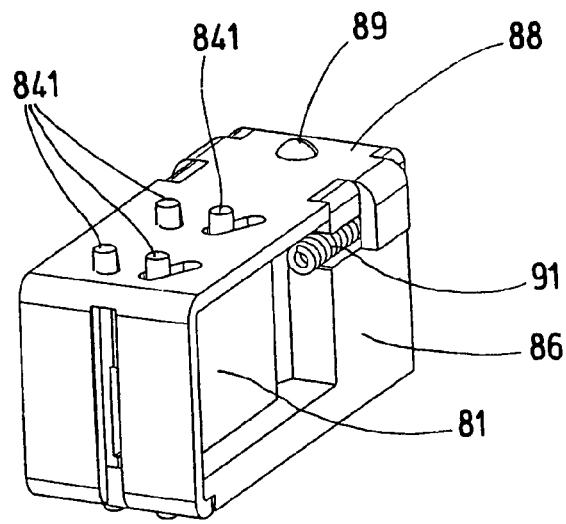
FIG. 16 is a perspective view of the clamping device in FIG. 15 with the sliding grip actuating element removed.
Figure 17:
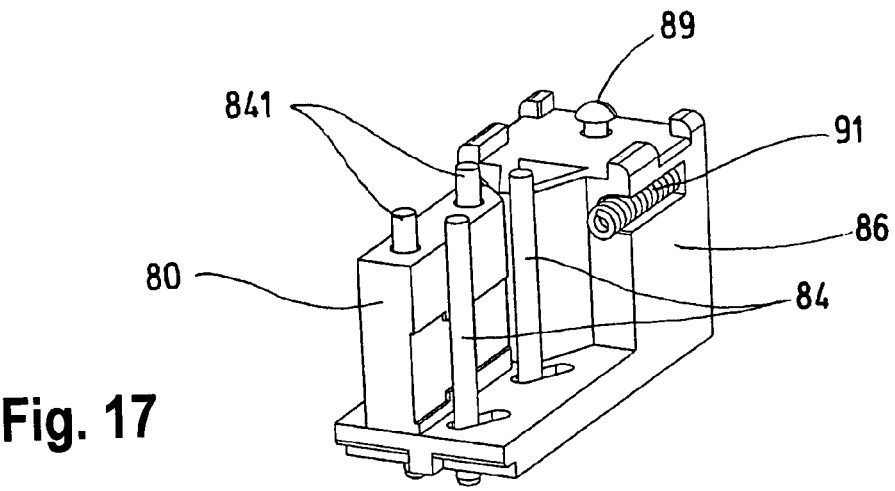
FIG. 17 is a perspective view of the clamping device in FIG. 16, with the counterpart holder and the second clamping jaw removed.

The end-mounted clamping device is shown in FIG. 15, while FIG. 16 shows the clamping device with the sliding grip 92 removed. FIGS. 16 and 17 show one of the clamping springs 91 contained in the grooves 90 of the holder 86 in the installed position in which it rests against the holder 86 and the upper grip part 922 of the sliding grip 92. By means of the sliding grip 92, the clamping springs 91 embodied in the form of compression springs press the clamping jaws 80, 81 into the end position depicted in FIG. 16 in which the two clamping jaws 80, 81 are pressed against each other. FIG. 17 shows the partially assembled clamping device in which not only has the counterpart holder 88 been removed from the holder 86, but also the clamping jaw 81 has been removed from the guide bolts 84.

If the sliding grip 92 is moved in the direction of the arrow 96 in FIG. 15, then the guide pins 841 protruding out from the clamping jaws 80, 81 and into the transverse grooves 93 in the grip parts 921 and 922 are moved in the guide slots 85 and 87 of the holder 86 and counterpart holder 88 toward the other end of the guide slots 85 and 87. This moves the clamping jaws 80, 81 away from each other, producing an opening slot through which the clamping shank 111 of a saw blade 11 can be inserted between the clamping jaws 80, 81. If this is a jigsaw blade 11 with a single-cam shank, then the latter is inserted into the congruent recesses 82 on the support surfaces 801 and 802 of the clamping jaws 80, 81.

If the sliding grip 92 is released, then the clamping springs 91 slide the sliding grip 92 back into the end position shown in FIGS. 15 through 17 until the clamping jaws 80, 81 press with their support surfaces 801 and 802 against the clamping shank 111, fixing it between themselves in a form-locked manner; in the case of the single-cam shank, an additional form-locked connection is produced between the clamping shank 111 and the clamping jaws 80, 81.

It will be understood that each of the elements described above, or two or more together, may also find a useful application in other types of constructions differing from the types described above.

While the invention has been illustrated and described as embodied in a clamping device for toolless clamping of a saw blade, it is not intended to be limited to the details shown, since various modifications and structural changes may be made without departing in any way from the spirit of the present invention.

Without further analysis, the foregoing will reveal fully revela the gist of the present invention that others can, by applying current knowledge, readily adapt it for various applications without omitting features that, from the standpoint of prior art, fairly constitute essential characteristics of the generic or specific aspects of the invention.

The invention claimed is:

1. A clamping device for toolless clamping of saw blades equipped with a clamping shank for a hand machine tool, said clamping device comprising two clamping parts that are pressable against each other, each of said clamping parts being provided with a support surface for the clamping shank of a saw blade insertable between said clamping parts, at least one of said clamping parts being movable in relation to the other of said clamping parts in order to clamp and release the clamping shank; and an independent actuating element that is movable by hand and provides a movement of said at least one clamping part, wherein said at least one clamping part is a tool clamp attachable to a drive element of the hand machine tool, while the other of said clamping parts is a pressed part that is mounted in said tool clamp in a relatively movable fashion and is connected via a coupling element to said actuating element; wherein said coupling element is a sliding sleeve accommodated on said tool clamp in an axially sliding fashion, said sliding sleeve having a sleeve wall which is provided with at least two diametrically opposed guide slots extending at an angle of inclination to a longitudinal axis of said sliding sleeve, into which diametrically opposed guide pins, projecting from said pressed part protrude; and wherein said actuating element is a rotating sleeve, that encompasses said sliding sleeve, and is attached to said sliding sleeve by a screw thread.

2. A clamping device as defined in claim 1, wherein at least one of the support surfaces of said clamping parts has a recess which is configured so that its contour replicates a contour of the clamping shank of at least one of the saw blades to be clamped.

3. A clamping device as defined in claim 1, wherein one of said support surfaces of said clamping parts has a positioning pin protruding from said one of said support surfaces, said positioning pin being slidable back behind a corresponding support surface counter to a spring force and being configured to be inserted in a form-locked manner into a positioning hole in the clamping shank of at least one of the saw blades to be clamped.

4. A clamping device as defined in claim 1, wherein said tool clamp has a base plate provided with a support surface for the clamping shank of a saw blade and two side walls integral to said base plate and protruding from the latter, each of said side walls being provided with at least one guide slot extending at a right angle to said base plate, said press part being configured as a plate-shaped counterpart holder that is provided with another support surface and is supported in a movable fashion in said guide slots by said guide pins protruding from narrow longitudinal sides of said holder and oriented away from each other.

5. A clamping device as defined in claim 4, wherein said rotating sleeve is attached to said sliding sleeve by said groove thread which is configured as a trapezoidal thread.

6. A clamping device as defined in claim 4, and further comprising an end flange that closes each of ends of said sliding sleeve and has a recess for axially guiding said sliding sleeve against said side walls of said tool clamp.

7. A clamping device as defined in claim 1, wherein said counterpart holder has a guide hole extending through a support surface through which a positioning pin protrudes, said positioning pin having an end oriented away from said base plate of said tool clamp; and further comprising a leaf spring that is attached to said counterpart holder and engages said end of said positioning pin.

8. A clamping device as defined in claim 1, wherein said base plate of said tool clamp has a support surface provided with a recess for accommodating the clamping shank in a form-locked manner.

* * * * *